United States Patent [19]

You

[11] Patent Number: 6,051,202
[45] Date of Patent: Apr. 18, 2000

[54] METHOD FOR PREPARING FAR-INFRARED RADIATING MATERIAL

[76] Inventor: Kyu Jae You, 48, Nackdong-ri, Nam-myon, Jungsun-kun, kangwon-do, Rep. of Korea

[21] Appl. No.: 09/009,840

[22] Filed: Jan. 20, 1998

[30] Foreign Application Priority Data

Jan. 22, 1997 [KR] Rep. of Korea .......................... 97-1689

[51] Int. Cl.[7] .............................. C09K 11/08; C01B 33/26
[52] U.S. Cl. .................................. 423/328.1; 252/301.4 F; 252/301.4 R; 252/587; 423/327.1; 423/330.1; 501/127; 501/128; 501/153; 428/917
[58] Field of Search .............................. 423/327.1, 328.1, 423/330.1; 252/301.4 F, 301.4 R, 587; 501/127, 128, 153; 428/917

Primary Examiner—Anthony Green
Attorney, Agent, or Firm—Blakely Sokoloff Taylor & Zafman

[57] ABSTRACT

A process for preparing far-infrared radiating material. More particularly, this invention relates to a process for preparing far-infrared radiating material which makes maximum use of thermal radiation with a higher specific surface area. The present invention comprises the steps of preparing ultra-fine aluminum silicate salt for nucleus material, adding a silicate gel to said nucleus material, and then adding $AlCl_3$, $FeCl_2$, and $MnCl_2$ to resulting mixture and neutralizing the resulting mixture with an ammonia solution. The present invention can be applied to vinyl films for agricultural use, wrappers, paint for cars, drying, heating, facilitation of fermentation, maturation of liquors, medical treatment, etc.

3 Claims, No Drawings

METHOD FOR PREPARING FAR-INFRARED RADIATING MATERIAL

FIELD OF THE INVENTION

The present invention relates to a process for preparing far-infrared radiating material. More particularly, this invention relates to a process for preparing far-infrared radiating material which makes maximum use of thermal radiation with a high specific surface area.

Far-infrared radiating material prepared by the present invention maximizes effects of radiation, which is more efficient than convection or conduction for heat transfer.

BACKGROUND OF THE INVENTION

As paper or wood is inflammable, and metals have very low emissivity, ceramics have been widely used for far-infrared radiating material. Ceramics are nonflammable, and have higher emissivity.

Emissivity is expressed in watts per area ($W/m^2$). Therefore, for materials of the same weight, the optimal condition for emissivity is satisfied with a material comprising particles having a larger specific surface area ($m^2/g$).

In the prior art, particles with an average particle size of not greater than 350 mesh, about 40 $\mu$m, have been used. However, ultra-fine powder with an average particle size of not greater than 0.1 $\mu$m, and a BET specific surface area of not less than 10 $m^2/g$, has rarely been prepared.

In the prior art, zirconia, alumina, or ceramics of transition metal oxides such as $MnO_2$, $Fe_2O_3$, CuO, which are similar to a black body, were preferably used for far-infrared radiating material. However, in some fields such as the food industry, the textile industry, etc, white color rather than black color is preferable for clearness of objects to which the material is applied.

U.S. Pat. No. 5,356,724 (Tsuda et al.) describes a material for producing far-infrared radiation comprising a substrate and an Al-Mn alloy-derived oxide surface layer on the substrate, the oxide surface layer being porous with an average pore diameter of 0.01–2.0 micrometers and a porosity of $10^3$–$10^{12}$ pores/$cm^2$, the weight ratio of Mn/Al in the oxide surface layer being 0.001–2.0, and the thickness of the oxide surface layer being 0.1–100 micrometers.

U.S. Pat. No. 5,480,647 (Tsai) describes a medical compound comprising 70–90% by weight of powdered perlite and 10–30% by weight of at least one metallic oxide of which the metal is selected from the group of tantalum, niobium, palladium, nickel, germanium, titanium, and zirconium.

U.S. Pat. No. 5,028,760 (Shigeru et al) describes an infrared electric panel heater including an open side covered by a sintered or electroformed porous metallic panel. A sheathed electric heating element is installed in the housing in contact with the inner surface of the porous panel. The outer surface of the porous panel is substantially entirely covered with a ceramic layer, selected from the group consisting of $Al_2O_3$, $TiO_2$, $Cr_2O_3$, MgO, $ZrO_2$, $SiO_2$ and mixtures thereof, which layer emits far-infrared rays when heated.

U.S. Pat. No. 5,058,196 (Nakamura et al.) describes a far-infrared heater having a plate-like porous metallic panel, formed by an electroforming process, installed in a box-like housing over an electric heating element therein. The panel is heated by the element and has its outer surface covered by a porous ceramic far-infrared emitting layer of $Al_2O_3$, $TiO_2$, $Cr_2O_3$, MgO, $ZrO_2$, $SiO_2$ or mixtures thereof.

U.S. Pat. No. 5,542,194 (Hanzawa et al.) describes a body for emitting far-infrared radiation possessing high emissivity in a wide range corresponding to all the wavelengths of far-infrared radiation, which possesses excellent anticorrosivity and intensity properties. The body includes a ceramic containing SiC, preferably a Si-SiC ceramic.

SUMMARY OF THE INVENTION

The object of the present invention is to provide a process for preparing far-infrared radiating material, which makes maximum use of thermal radiation using a high specific surface area.

A process of the present invention for preparing far-infrared radiating material comprises the steps of mixing a solution of aluminum chloride with water glass to form an aluminum silicate gel, adding a suspension of alkali earth-metal hydroxides to said aluminum silicate gel to form a calcium and magnesium salt of aluminum silicate, aging the resulting first mixture, neutralizing a second mixture of a solution of sodium aluminate and water glass by adding hydrochloric acid to form an aluminum silicate gel, mixing said aged first mixture with said aluminum silicate gel while heating and agitating so as to form an ultra-fine aluminum silicate salt, mixing water glass with hydrochloric acid to produce a silicate gel, adding said silicate gel to said ultra-fine aluminum silicate salt, adding $AlCl_3$, $FeCl_2$, and $MnCl_2$ to the mixture, and neutralizing the resulting mixture with an ammonia solution.

The far-infrared radiating material of the present invention can be applied to various fields, for example, surface-coated vinyl film for agricultural uses such as facilitation of growth of plants, wrappers for maintaining freshness of vegetables, fruits, etc., paint for cars, drying device for food, heating apparatus for such devices as saunas, facilitation of fermentation, maturation of liquors, warming a human body, and medical treatments such as promotion of blood circulation.

In the above cases, the objects to be heated usually contain abundant water. If the object to be heated is animal or plant material which contains more than 60% water, far-infrared radiation with wavelength of 4 to 16 $\mu$m is adopted to maximize the effects of thermal radiation.

DETAILED DESCRIPTION OF THE PREFERRED EMBODIMENTS

In the present invention, ultra-fine aluminum silicate salt with specific surface area of 400 $m^2/g$, disclosed in Korean Patent Application No. 96-64586 is used for the crystalline nucleus material. Film-like or needle-shaped ultra-fine particles including Al, Fe, and Mn, which are optimal for far-infrared radiation, are precipitated using the nucleus material to produce white fine particles with a BET specific surface area of not less than 400 $m^2/g$. The detailed process thereof is as follows:

1) Preparation of nucleus material

Ultra-fine particles of aluminum silicate salt are prepared as follows:

(a) A solution of aluminum chloride is mixed with a soluble silicate-containing material, e.g. water glass to form an aluminum silicate gel.

(b) Then, a suspension of alkali earth-metal hydroxides is added to the aluminum silicate gel to form a calcium and magnesium salt of aluminum silicate in which the molar ratio of $SiO_2$ plus $Al_2O_3$ to CaO plus MgO is in the range of 0.5~1.5/1.

(c) The resulting mixture is aged by heating and agitating.

(d) A second mixture, consisting of a solution of sodium aluminate and water glass, is neutralized by adding hydrochloric acid to form an aluminum silicate gel.

(e) Said aged mixture of step (c) is mixed with said aluminum silicate gel resulting from the neutralizing step (d), while heating and agitating to form an ultra-fine aluminum silicate salt with a molar ratio of 1.5 to 3.5/1 for $SiO_2$ plus $Al_2O_3$ to CaO plus MgO, and a molar ratio of 0.1 to 1.0/1 for $Al_2O_3$ to $SiO_2$, and a molar ratio of 0.1 to 0.5/1 for MgO to CaO, and a BET specific surface area of not less than 400 $m^2/g$.

The aluminum silicate salt is used as crystalline nucleus material for the far-infrared radiating material of the present invention. The highly far-infrared radiating material of the present invention is produced by subjecting the nucleus material to the following steps:

2) First Step

Water glass is mixed with hydrochloric acid to produce a silicate gel. Then, 5 to 10 parts by weight of the silicate gel are added to 100 parts by weight of the nucleus material.

3) Second Step $AlCl_3$, $FeCl_2$, and $MnCl_2$ are added to the mixture resulting from the first step at a total amount for all three of 10 to 50 parts by weight per 100 parts by weight of the nucleus material, to achieve a molar ratio of 1/0.2 to 0.5 for $Al_2O_3$ to FeO plus MnO, and 1/0.5 to 1.5 for FeO to MnO. Then, the resulting mixture is neutralized with an ammonia solution.

White powder which can produce far-infrared radiation with a BET specific surface area of not less than 400 $m^2/g$ and a whiteness of not less than 85%, is thus obtained.

The present invention will now be described in more detail, with reference to the following illustrative Examples.

EXAMPLE 1

1) Preparation of nucleus material

4% by weight, based on $Al_2O_3$, of $AlCl_3$ solution at 50° C. was added to 4% by weight, based on $SiO_2$, of water glass No. 3 at 50° C. with stirring to obtain an aluminum silicate gel with a molar ratio of 0.2/1 for $Al_2O_3$ to $SiO_2$. The mixture was stirred for 40 minutes. Then, 4% by weight of a suspension of $Ca(OH)_2$ and $Mg(OH)_2$ at 50° C. was added to the aluminum silicate gel at 50° C., and the mixture was stirred for 40 minutes. The molar ratio of MgO to CaO was 0.3/1. Aging the above mixture at 90° C. with stirring for 1.5 hour yielded a product having a molar ratio of $SiO_2$ and $Al_2O_3$ to CaO and MgO of 0.8/1.

Another aluminum silicate gel was prepared by adding 4% by weight of hydrochloric acid at 50° C. to a mixed solution of 4% by weight of water glass No.3 at 50° C. and 4% by weight, based on $Al_2O_3$, of sodium aluminate at 50° C. Then, the resulting aluminum silicate gel was added to the product obtained above, with stirring for 40 minutes, to produce a second product with a molar ratio of 2.0/1 for $SiO_2$ and $Al_2O_3$ to CaO and MgO. The second product was washed and subjected to the following first and second steps without drying or powdering.

2) First step 8 parts by weight of a silicate gel obtained by admixing 4% by weight, based on $Al_2O_3$, of water glass with 4% by weight of hydrochloric acid at 50° C., were added to 100 parts by weight of the nucleus material.

3) Second step

4% by weight, based on $Al_2O_3$, FeO, or MnO respectively, of $AlCl_3$, $FeCl_2$ and $MnCl_2$ at 50° C. were added to the mixture from the first step at an amount of 30 parts by weight per 100 parts by weight of the nucleus material. The resulting mixture was neutralized with an ammonia solution. The molar ratio of $Al_2O_3$ to FeO and MnO was 1/0.3, and that of FeO to MnO was 1/1.

EXAMPLES 2 TO 6 AND COMPARATIVE EXAMPLES 1 TO 6

The conditions for preparing nucleus material in Examples 2 to 6, and Comparative Examples 1 to 6 are the same as Example 1.

Conditions in the first and second steps, and BET specific surface areas, are shown in Table 2.

The temperature and concentration of the chemicals used in Examples 2 to 6, and Comparative Examples 1 to 6, are the same as those of Example 1. All the resulting products in Examples and Comparative Examples are white particles with whiteness of not less than 85%.

TABLE 1

Conditions for the preparation of nucleus material in Examples and Comparative Examples

| Reactant | | Condition Range | Condition |
|---|---|---|---|
| 1st Reaction | | | |
| Water glass | temperature(° C.) | 40–80 | 50 |
|  | concentration(%) | 3–8 | 4 |
| $AlCl_3$ | temperature(° C.) | 40–80 | 50 |
|  | concentration(%) | 3–8 | 4 |
| $Al_2O_3/SiO_2$ | molar ratio | 0.1–1.0/1 | 0.2/1 |
| Alkali  $Ca(OH)_2$ | temperature(° C.) | 40–80 | 50 |
| earth | concentration(%) | 3–8 | 4 |
| metal  $Mg(OH)_2$ | temperature(° C.) | 40–80 | 50 |
| hydroxide | concentration(%) | 3–8 | 4 |
| MgO/CaO | molar ratio | 0.1–1.5/1 | 0.3/1 |
| Aging | temperature(° C.) | 80–95 | 90 |
|  | time(hour) | 1–2 | 1.5 |
| First product $SiO_2 + Al_2O_3/CaO + MgO$ | molar ratio | 0.5–1.5/1 | 0.8/1 |
| 2nd Reaction | | | |
| Water glass | temperature(° C.) | 40–80 | 50 |
|  | concentration(%) | 3–8 | 4 |
| Sodium aluminate | temperature(° C.) | 40–80 | 50 |
|  | concentration(%) | 3–8 | 4 |
| HCl | temperature(° C.) | 40–80 | 50 |
|  | concentration(%) | 3–8 | 4 |
| Second product $SiO_2 + Al_2O_3/CaO + MgO$ | molar ratio | 1.5–3.5/1 | 2.0/1 |
| BET specific surface area | $m^2/g$ | not less than 400 | 450 |

TABLE 2

Conditions in the 1st and 2nd Steps and Results thereof

| | 1st Step | 2nd Step | | | Results |
|---|---|---|---|---|---|
| Range of Condition | added quantity of silicate gel parts by weight/ 100 parts by weight of nucleus material 5–10 | AlCl$_3$ + FeCl$_2$ + MnCl$_2$ parts by weight/ 100 parts by weight of nucleus material 10–50 | Al$_2$O$_3$/ FeO + MnO molar ratio 1/0.2–0.5 | FeO/MnO molar ratio 1/0.5–1.5 | BET specific surface area m$^2$/g not less than 400 |
| Examples | | | | | |
| 1 | 8 | 30 | 1/0.3 | 1/1 | 405 |
| 2 | 5 | 30 | 1/0.3 | 1/1 | 400 |
| 3 | 10 | 30 | 1/0.3 | 1/1 | 410 |
| 4 | 8 | 15 | 1/0.3 | 1/1 | 400 |
| 5 | 8 | 50 | 1/0.3 | 1/1 | 450 |
| 6 | 8 | 30 | 1/0.5 | 1/1 | 430 |
| Comparative Examples | | | | | |
| 1 | 2 | 30 | 1/0.3 | 1/1 | 385 |
| 2 | 15 | 30 | 1/0.3 | 1/1 | 340 |
| 3 | 8 | 2 | 1/0.3 | 1/1 | 380 |
| 4 | 8 | 70 | 1/0.3 | 1/1 | 390 |
| 5 | 8 | 30 | 1/1 | 1/1 | 360 |
| 6 | 8 | 30 | 1/0.3 | 1/0.1 | 350 |

The intensity ratio of far-infrared radiation emitted by the example materials is shown in Table 3. The intensity ratio was measured with an infrared spectrophotometer using a pseudo-black body as a reference material. A black powder which was produced by burning at 1200° C. a mixture of MnO$_2$, Fe$_2$O$_3$, CuO, CoC, kaolin, and betalite, currently known as the best far-infrared radiating material, was used for the pseudo-black body. The intensity of far-infrared radiation of the material was measured with a detector plotting values in comparison with that of the pseudo-black body in each frequency in the range of 2–30 μm.

The intensity ratio which was calculated from an integration average of intensity of far-infrared radiation in the 4 μm to 16 μm of frequency range, which is important for practical applications, measured at 300° C., is the radiation intensity ratio relative to the radiation intensity 4 μm to 16 μm of Example 1.

TABLE 3

Far-infrared Radiation Intensity Ratio

| Examples | | Intensity Ratio(%) | Comparative Examples | | Intensity Ratio(%) |
|---|---|---|---|---|---|
| Examples | 1 | 100 | Comparative | 1 | 70 |
| | 2 | 95 | Examples | 2 | 70 |
| | 3 | 90 | | 3 | 50 |
| | 4 | 95 | | 4 | 80 |
| | 5 | 95 | | 5 | 75 |
| | 6 | 90 | | 6 | 70 |
| | | | pseudo-black body | | 45 |

The Effects of the Present Invention

The efficiently far-infrared radiating material of the present invention can make maximum use of thermal radiation whose major factor is high specific surface area.

The far-infrared radiating material of the present invention can be applied to a surface-coated vinyl film for agricultural use such as facilitation of plant growth, wrappers for maintaining freshness of vegetables, fruits, etc., paint for cars, drying device for food, heating apparatus for such uses as saunas, facilitation of fermentation, maturation of liquors, warming a human body, and medical treatment such as promotion of blood circulation. In addition, the material of the present invention has function for fillers for rubbers, plastics, paints, and inks, due to its small particle size and little cohesive property. Thus, it can satisfy needs in the relevant fields.

The present invention has been described in detail so as to allow one skilled in the art to practice it. However, nothing in the above description limits the scope of the invention, which is defined by the claims below.

It will be obvious to one skilled in the art that numerous equivalents, substitutions and minor adaptations of the invention are possible without departing the scope of the invention.

What is claimed is:

1. A process for preparing far-infrared radiating material comprising the steps of:
   (a) mixing a solution of aluminum chloride with a soluble silicic acid-containing material to form an aluminum silicate gel;
   (b) adding a suspension of alkali earth-metal hydroxides to said aluminum silicate gel to form a calcium and magnesium salt of aluminum silicate in which the molar ratio of SiO$_2$ plus Al$_2$O$_3$ to CaO plus MgO is in the range 0.5 to 1.5/1;
   (c) aging the resulting first mixture by heating and agitating;
   (d) neutralizing a second mixture of a solution of sodium aluminate and a soluble silicic acid-containing material by adding hydrochloric acid to form an aluminum silicate gel;
   (e) mixing said aged first mixture with said aluminum silicate gel of step (d) while heating and agitating so as to form an ultra-fine aluminum silicate salt with a molar ratio in the range of 1.5 to 3.5/1 for SiO$_2$ plus Al$_2$O$_3$ to CaO plus MgO, a molar ratio in the range of 0.1 to 1.0/1 for $Al_2O_3$ to $SiO_2$, a molar ratio in the range of 0.1 to 0.5/1 for MgO to CaO, and a BET specific surface area of not less than 400 $m^2/g$;

(f) mixing a soluble silicic acid-containing material with hydrochloric acid to produce a silicate gel;

(g) adding 5 to 10 parts by weight of said silicate gel of step (f) to 100 parts by weight of said ultra-fine aluminum silicate salt;

(h) adding $AlCl_3$, $FeCl_2$, and $MnCl_2$ to the mixture at a total amount of 10 to 50 parts by weight per 100 parts by weight of said ultra-fine aluminum silicate salt; so as to have molar ratios in the range of 1/0.2 to 0.5 for $Al_2O_3$ to FeO plus MnO, and 1/0.5 to 1.5 for FeO to MnO; and (i) neutralizing the resulting mixture with an ammonia solution.

2. A process according to claim 1, wherein said soluble silicic acid-containing material is water glass.

3. A process according to claim 1, wherein the BET specific surface area of said far-infrared radiating material is not less than 400 $m^2/g$.

* * * * *